United States Patent
Baba

Patent Number: 5,479,274
Date of Patent: Dec. 26, 1995

[54] OPTICAL IMAGE SCANNING APPARATUS DETECTING SHEET SIZE AND DISPLACEMENT

[75] Inventor: Nobuyuki Baba, Sagamihara, Japan

[73] Assignee: Ricoh Company, Ltd., Tokyo, Japan

[21] Appl. No.: 195,204

[22] Filed: Feb. 14, 1994

[30] Foreign Application Priority Data

Feb. 15, 1993 [JP] Japan .................. 5-025185

[51] Int. Cl.$^6$ .......................... G02B 5/32; G02B 26/10; G01N 21/86; G01V 9/04
[52] U.S. Cl. ................ 359/17; 250/548; 250/559.01; 355/311; 355/317
[58] Field of Search ............... 359/17, 18, 216, 359/217; 355/311, 317; 250/202, 548, 571; 358/129

[56] References Cited

U.S. PATENT DOCUMENTS

| | | | |
|---|---|---|---|
| 4,165,464 | 8/1979 | Ikeda et al. | 359/18 |
| 4,224,509 | 9/1980 | Cheng | 359/18 |
| 4,333,006 | 6/1982 | Gorin et al. | 359/18 |
| 4,761,046 | 8/1988 | Funato | 359/18 |
| 4,873,550 | 10/1989 | Watanabe | 355/311 |
| 4,924,262 | 5/1990 | Budnik | 355/311 |
| 5,032,867 | 7/1991 | Nagata et al. | 355/311 |
| 5,036,354 | 7/1991 | Miyamoto | 355/311 |
| 5,198,853 | 3/1993 | Ichihara et al. | 355/311 |
| 5,252,991 | 10/1993 | Storne et al. | 355/311 |
| 5,258,862 | 11/1993 | Harris | 359/18 |
| 5,260,725 | 11/1993 | Hammond | 355/317 |
| 5,328,166 | 7/1994 | Hokamura | 355/311 |
| 5,387,968 | 2/1995 | Wakikaido et al. | 355/311 |

FOREIGN PATENT DOCUMENTS

| | | |
|---|---|---|
| 53-117333 | 10/1978 | Japan. |
| 4-178601 | 6/1992 | Japan. |

Primary Examiner—Martin Lerner
Attorney, Agent, or Firm—Oblon, Spivak, McClelland, Maier, & Neustadt

[57] ABSTRACT

An image scanning apparatus can obtain, using a simple optical detection system, original sheet information including size and displacement information of an original sheet before an image scanning operation starts. The image scanning apparatus comprises a single beam emitting unit for emitting a coherent first beam. A deflecting unit deflects the first beam so that the first beam traces a predetermined scan line on a plane including a surface of the original sheet. A second beam is generated by reflection of the first beam at the surface of the original, and the second beam is input to the sensing unit via the deflecting unit. The original sheet information is obtained in accordance with the detection of a sharp change in the intensity of the second beam received by the sensing unit with reference to the scanning position of the first beam.

8 Claims, 5 Drawing Sheets

OPTICAL IMAGE SCANNING APPARATUS DETECTING SHEET SIZE AND DISPLACEMENT

BACKGROUND OF THE INVENTION

The present invention generally relates to image scanning apparatuses, and more specifically to an optical image scanning apparatus used for printers, facsimile machines, copy machines or digital scanners.

In many conventional copy machines, the size of an original sheet set in a copying position is detected before a copying operation is started. The detection of the size of the original sheet is generally performed by means of an optical system. One method of the detection of the size uses a scanner which is provided for reading an image on the original. This method does not require an additional optical system for detecting the size. However, this method takes time to scan the entire original sheet before an actual copying operation is started, and thus it takes a relatively long time to make a copy. Accordingly, users are dissatisfied with a copy machine in which this method is used.

Another method of detecting the size of an original sheet is to use an additional detecting device. Japanese Laid Open Patent Application No. 4-178601 discloses an original sheet size detection system in which a grating array (hologram) is used in an optical detection system. FIG. 1 is an illustration of an example of an original sheet size detection system incorporated in a copy machine which system uses a hologram. FIG. 1 is a view of the inside of a scan table (contact glass) from directly above the contact glass.

In FIG. 1, three photosensor devices 2 are shown provided in predetermined positions, under a scan table which is made of transparent material such as glass. Each of the photosensor devices 2 comprises a hologram, a light source and a photosensor (not shown). A light beam emitted by each of the photosensor devices 2 is split into three beams a, b, c. Positions of the split light beams a, b, c at the scan table surface are shown in FIG. 1. The beams a, b, c are reflected by original sheet or other material, and the reflected beams return to the respective photosensors 2. The beams a, b, c are detected by the photosensors in the photosensor devices 2.

In the above-mentioned optical original sheet size detection system, since a light beam is split into three beams, three light sources are needed to emit light beams to direct the beams in nine directions, while nine light sources are needed in a conventional system. However, the above-mentioned system still requires at least three photosensors. Additionally, the sizes of the original sheet which can be detected are limited to predetermined sizes, for example a standard A-size sheet or B-size sheet, because the positions of beams projected on the scan table are fixed. Therefore, the above-mentioned optical original sheet size detection system cannot detect a sheet size other than one of the predetermined size.

An optical sensing device is disclosed in Japanese Laid-Open Patent Application No. 53-117333. FIG. 2 is an illustrative perspective view of the optical information reading device disclosed in Japanese Laid-Open Patent application No. 53-117333. This device is used as a bar code reader.

In FIG. 2, a laser beam emitted by a semiconductor laser 3 passes through a mirror having a hole, and is incident upon a hologram scanner (hologram disk) 6 rotated by a motor 5. The laser beam is deflected and concentrated, by hologram 6a formed on the rotating hologram scanner 6, onto the plane of a bar code 7 so that the laser beam scans the bar code as indicated by dotted line $S_o$. The laser beam reflected by the bar code is incident upon the hologram 6a at a position different from the position on which the laser beam was initially incident, and passes through the hologram scanner 6. The laser beam is then reflected by the mirror 4 and incident upon a photodetector 8. Bar code information is obtained by analyzing the intensity variations of the laser beam detected by the photodetector 8.

The above-mentioned scanning method disclosed in Japanese Laid-Open Patent application No. 53-117333 provides a simple optical detection system to recognize size and displacement of an original sheet by means of a simple construction. However, there has been suggested no image scanning apparatus using such a method in the art.

SUMMARY OF THE INVENTION

It is a general object of the present invention to provide an improved and useful image scanning apparatus in which the above-mentioned disadvantages are eliminated.

A more specific object of the present invention is to provide an image scanning apparatus which can obtain, using a simple optical detection system, original sheet information including size and displacement information of an original sheet before an image scanning operation starts.

In order to achieve the above-mentioned object, according to the present invention, there is provided an image scanning apparatus scanning an image formed on an original sheet placed on a scan table, original sheet information including size and displacement information of the original sheet placed on the scan table being obtained before scanning of the image is performed, the image scanning apparatus comprising:

a beam emitting unit for emitting a coherent first beam;

a deflecting unit for deflecting the first beam so that the first beam traces a predetermined scan line on a plane including a surface of the original sheet; and a beam sensing unit for sensing the intensity of a second beam generated by reflection of the first beam at the surface of the original, the second beam being input to the sensing unit via the deflecting unit, wherein the original sheet information is obtained in accordance with the detection of a sharp change in the intensity of the second beam received by the sensing unit with reference to a scanning position of the first beam.

Other objects, features and advantages of the present invention will become more apparent from the following detailed description when read in conjunction with the accompanying drawings.

DETAILED DESCRIPTION OF THE PREFERRED EMBODIMENTS

Figure 1:
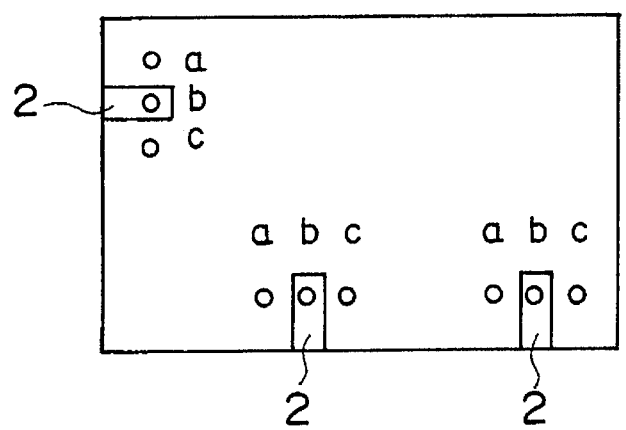
FIG. 1 is an illustration of an example of an original sheet size detection system of a copy machine which system uses a hologram.
Figure 3:
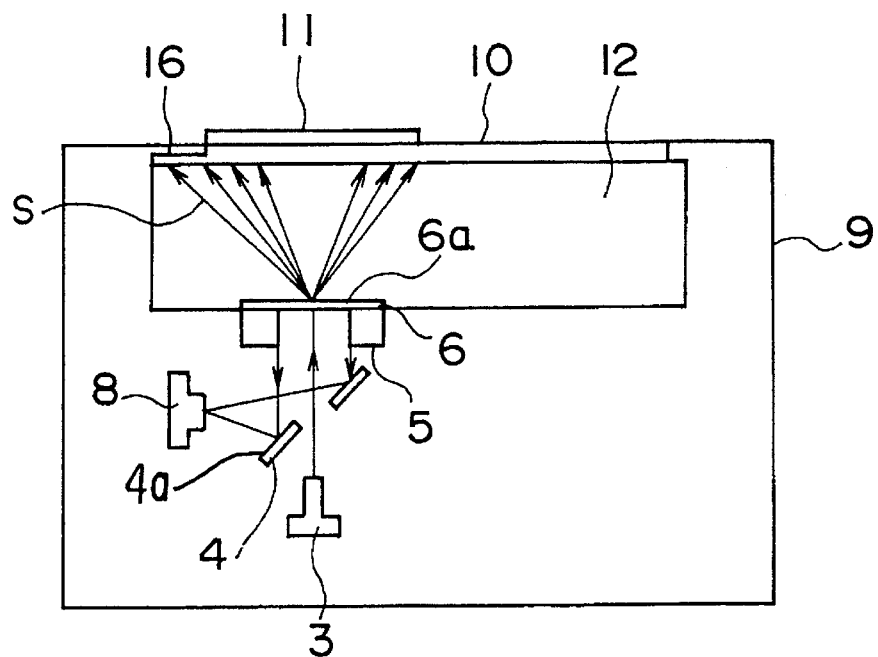
FIG. 3 is an illustration of a first embodiment of an image scanning apparatus according to the present invention.
Figure 4:
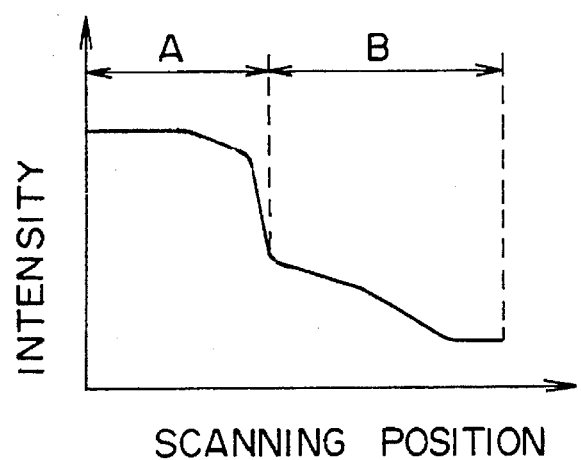
FIG. 4 is a graph showing a relationship between intensity of a reflected beam measured by a photodetector and a scanning position of the beam.

A description will now be given, with reference to FIGS. 3 through 5, of a first embodiment of an image scanning apparatus according to the present invention. FIG. 3 is an illustration of the first embodiment incorporated into a copy machine. In FIG. 3, parts that are the same as the parts shown in FIG. 1 are given the same reference numerals, and descriptions thereof will be omitted.

In FIG. 3, a contact glass 10 is provided on a top surface of the copy machine. An original sheet 11 is placed on the contact glass 10. Under the contact glass 10, there is provided an open space 12. A hologram scanner 6, as an optical deflector, is provided at the bottom part of the space 12. A hologram 6a is formed on the hologram scanner 6. The hologram 6 is rotated by a ring-type motor 5. A mirror 4 having a hole and a semiconductor laser 3 are provided under the hologram scanner 6. A photodetector 8 is positioned in a direction to which a laser beam reflected by a reflection surface 4a of the mirror 4 is transmitted. It should be noted that the mirror 4 having a hole therein provides a recurrent optical system which contributes to noise reduction in the optical system of the present embodiment, and thus the present embodiment has a good S/N ratio.

In the above-mentioned structure of the present embodiment, although the hologram 6 is used as an optical deflector, a galvano-mirror or a rotating mirror may be used. Additionally, mirrors may be used, instead of the hologram, to equalize path lengths and incident angles of beams to be reflected at the surface of the original sheet 11, however, complexity of the optical system is then increased. The reason for using the hologram 6a is that holograms have a simple construction with a high deflection efficiency. Especially, if a blazed grating type or a binary hologram is used as a transmission type hologram, the optical system can have a high deflection efficiency with a simple construction.

It should be noted that if a reflection type hologram is used, a beam has to be emitted from above the space 12; the hologram may be an obstacle to movement of other components such as image scanners. Thus, the reflection type hologram is not used in the present embodiment.

Figure 2:
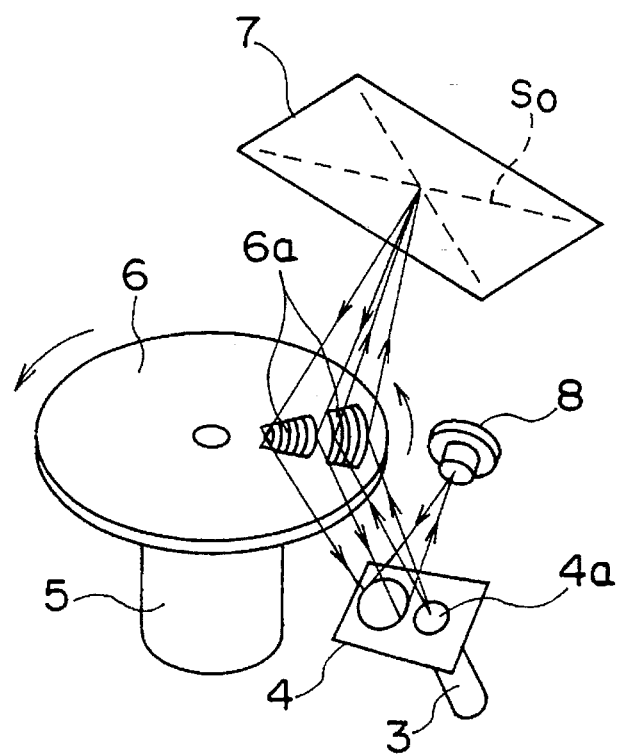
FIG. 2 is an illustrative perspective view of a conventional optical information reading device.

In the present embodiment, a laser beam having coherence and high directivity emitted by the semiconductor laser 3 scans a surface of the original 11 in the manner described with reference to FIG. 2. A reflected beam is measured by the photodetector 8. FIG. 4 is a graph showing a relationship between intensity of the reflected beam measured by the photodetector 8 and scanning position of the beam. In the graph of FIG. 4, the region indicted by an arrow A corresponds to the portion, namely surface of the original sheet 11, at which the beam is reflected. The region indicted by an arrow B represents the area (background) outside the original sheet 11. As shown in the graph, the presence of an original sheet can be recognized by detecting a sharp change in intensity of the reflected beam.

Figure 5:
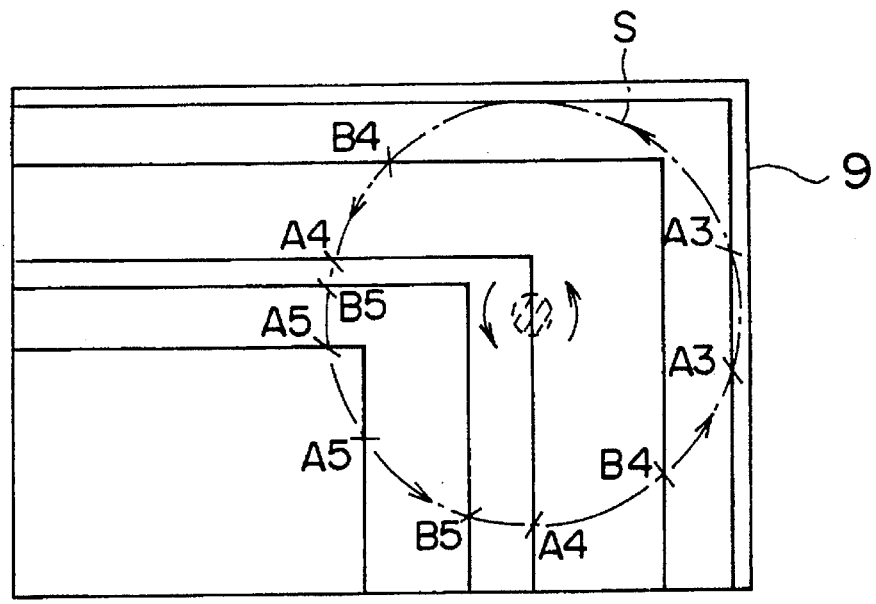
FIG. 5 is an illustration for explaining a relationship between sizes of original sheets and a scan line S of a beam circularly deflected by a rotating hologram.

FIG. 5 is an illustration for explaining a relationship between sizes of original sheets and a scan line S of the beam circularly deflected by the rotating hologram 6a. In FIG. 5, the sizes of original sheets A3, A4, A5, B4 and B5 are shown. In the condition shown in FIG. 5, the portion corresponding to the region A shown in FIG. 4 in the A5 case is the portion of the scan line S between the two detection points A5. Similarly, the portion of the scan line S between detection points B5 corresponds to a B5 size sheet. Other size sheets have their own detection points as shown in the figure. Accordingly, by detecting the detection points at which intensity of the reflected beam sharply changes, the size of the original sheet placed on the contact glass 10 can be obtained. Sizes other than the above-mentioned sizes can also be detected by the same means.

Information of size and displacement of the original sheet placed on the contact glass 10 can be obtained by detecting a sharp change near the detection points with reference to the scanning position information. Processing to obtain the information of size and displacement can be easily performed by a processing unit (not shown in the figures) usually provided in the image scanning apparatus.

According to the above-mentioned construction of the first embodiment, the size of the original sheet and displacement (or inclination) of the original sheet placed on the contact glass can be detected using a single light source and a single photodetector with a thin and compact construction.

The scan line S traced by the laser beam deflected by the hologram 6a may take any form appropriate to detect the size of the original sheet. However, it is preferable that the length of beam paths between the hologram 6a and any detection points on the scan line are uniform, and that incident angles on the original sheet 11 at any detection points on the scan line are uniform. In order to achieve this, the laser beam is deflected by the hologram 6a so that the scan line S becomes circular as shown in FIGS. 5 and 6.

Figure 6:
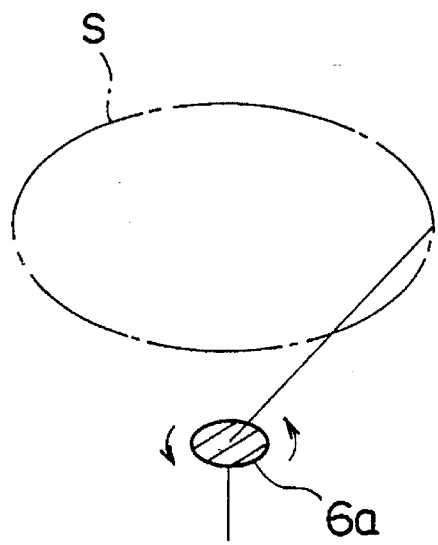
FIG. 6 is an illustration for explaining a positional relationship between the laser beam and the scan line.
Figure 7:
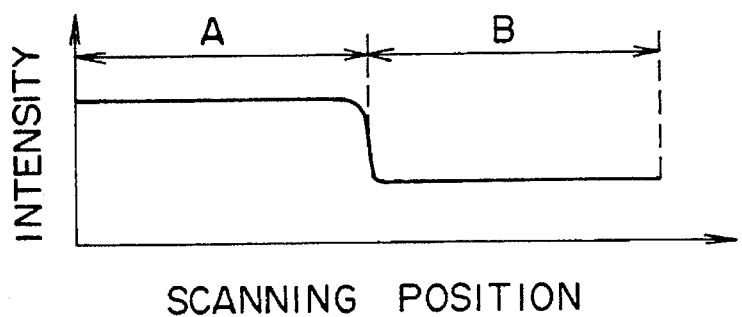
FIG. 7 is a graph showing a relationship between intensity of a reflected beam measured by a photodetector and a scanning position of the beam.

FIG. 6 is an illustration for explaining a positional relationship between the laser beam and the scan line. In the figure, the laser beam incident upon the hologram scanner 6 is deflected by the hologram 6a so that the laser beam traces a circle on the surface of the original sheet 11 (or background). By adopting this construction, the intensity of the scattered reflection beam received by the photodetector 8 becomes uniform, and thus the fluctuation of the intensity of the reflected beam measured by the photodetector 8 can be eliminated as shown in FIG. 7. The graph of FIG. 7 shows that the measured intensity of the beam is constant in the area A and the area B as compared to the graph shown in FIG. 4. Therefore, simple signal processing of the signal generated by the photodetector 8 can be used, and the occurrence rate of erroneous detections can be reduced.

It should be noted that the present embodiment uses, as mentioned above, a blazed grating or binary type hologram which traces a single scan line since normal holograms form two scan lines.

Figure 8:
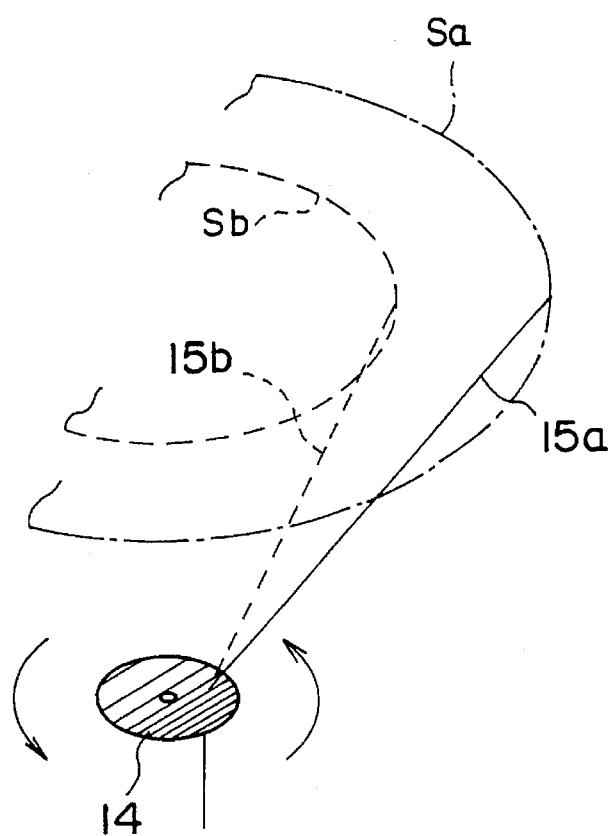
FIG. 8 is an illustration showing a hologram forming two scan lines.

However, it may be useful to use a hologram 14 which forms two concentric scan lines as shown in FIG. 8. The hologram 14 has two gratings comprising a first grating and a second grating, the spatial frequency of the first grating is higher than that of the second grating. A deflected laser beam 15a diffracted by the first grating traces a circular scan line Sa, and a deflected laser beam 15b diffracted by the second grating traces a circular scan line Sb.

By using two deflected beams tracing different scan lines, respectively, at the same time, more information about the original sheet can be obtained than when a single scan line construction is used, and thus an accurate detection of the original sheet can be performed in a short time. Crossed scan lines which may be traced by means of a mirror system may be useful to obtain further accurate information.

Additionally, as shown in FIG. 3, a reference sample 16 for an original sheet may be provided at a position other than the detection area for the original sheet. The reference sample 16 may be a plate-like member having a beam reflection characteristic similar to that of the original sheet to be placed on the contact glass 10, and can be attached, for example, on a frame (not shown in the drawing figure) of the contact glass 10. A reference intensity of the reflected beam corresponding to the original sheet area can be obtained by scanning the reference sample 16. By comparing the intensity obtained by scanning an original sheet with the reference intensity, the intensity of the original sheet can be determined, and thus the intensity of a copy can be adjusted to have a high contrast.

Figure 9:
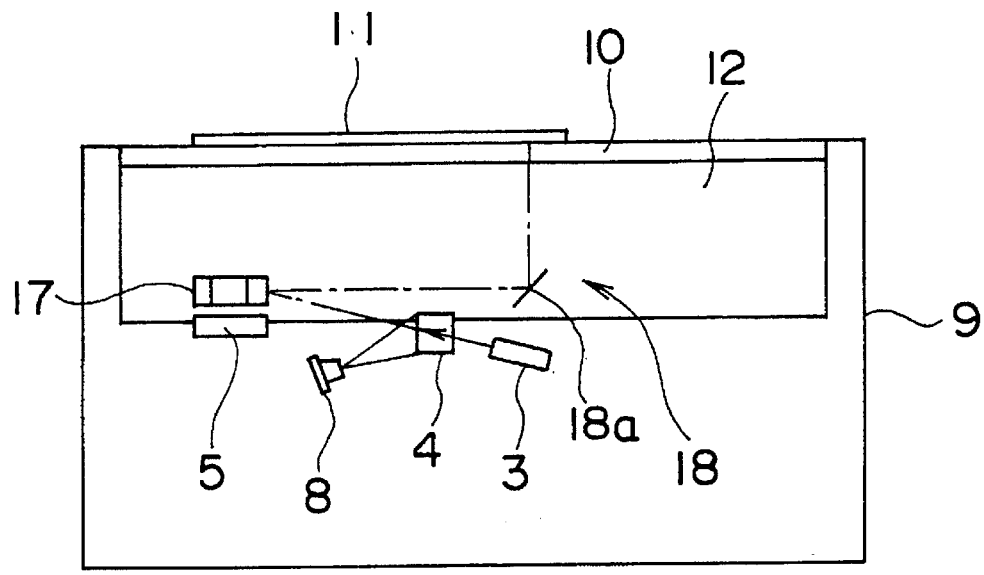
FIG. 9 is an illustration of a second embodiment of an image scanning apparatus according to the present invention.

A description will now be given, with reference to FIG. 9, of a second embodiment of an image scanning apparatus according to the present invention. FIG. 9 is an illustration showing the second embodiment of an image scanning apparatus according to the present invention. In FIG. 9, parts that are the same as the parts shown in FIG. 3 are given the same reference numerals, and descriptions thereof will be omitted.

The second embodiment is provided with a polygon mirror 17, instead of the hologram of the first embodiment, so as to deflect the laser beam emitted by the semiconductor laser 3 in a direction parallel to the surface of the original sheet 11. Additionally, the second embodiment is provided with a mirror system 18 comprising a plurality of mirrors 18a reflecting the laser beam deflected by the polygon mirror 17.

In the above-mentioned construction of the second embodiment, the laser beam emitted by the semiconductor laser 3 passes through the mirror 4, as is the same with the first embodiment, and is deflected by the polygon mirror 17. The direction of the laser beam deflected by the polygon mirror 17 varies within a plane generally parallel to the original sheet 11. The laser beam is then incident upon the mirrors 18a of the optical system 18, and reflected by the mirrors 18a towards the original sheet 11 so that the laser beam is projected onto the original sheet 11 in a direction perpendicular to the surface of the original sheet 11.

Figure 10:
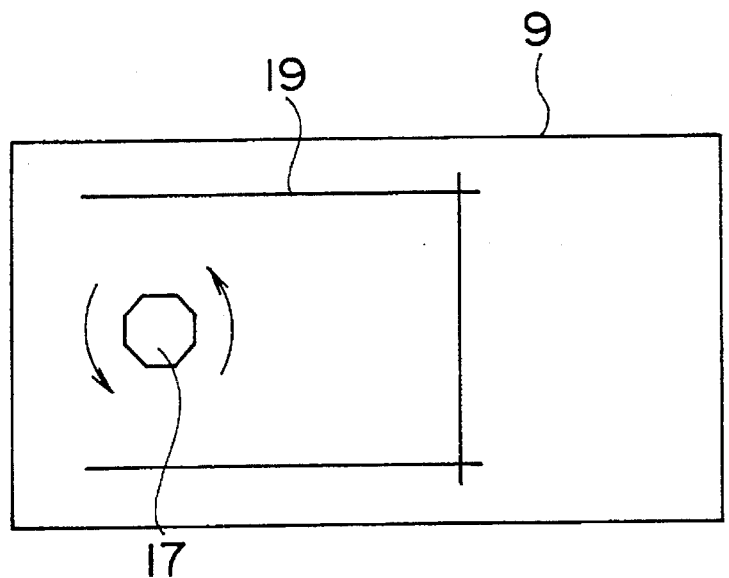
FIG. 10 is an illustration showing a scan line used in the image scanning apparatus shown in FIG. 9.

The laser beam reflected by the mirrors 18a traces a scan line 19 as shown in FIG. 10. The laser beam incident upon the original sheet 11 is reflected and returns to the mirror 4 since the mirrors 18a and the polygon mirror 17 form a recurrent optical system. The laser beam returned to the mirror 4 is reflected by the mirror 4 and enters into the photodetector 8. The photodetector 8 measures the intensity of the laser beam so that the presence of the original sheet 11 and displacement of the original sheet 11 are detected in the manner the same as that of the first embodiment.

According to the present embodiment, since the laser beam is projected onto the original sheet 11 in a direction perpendicular to the surface of the original sheet 11, a sufficient reflection can be obtained. Thereby, even if the distance between the polygon mirror 17 and the detection point on the scan line is large, a sufficient intensity of reflected beam can be obtained, and accordingly an image scanning apparatus which can detect a large size original sheet can be realized. Additionally, because the laser beam is always incident upon the original sheet in a direction perpendicular to the surface of the original sheet regardless of the distance between the polygon mirror 17 and the surface of the original sheet 11, the space 12 provided for the laser beam path can be minimized. Thus an image reading device using the construction of the present embodiment can be made thin.

It should be noted that, instead of the polygon mirror 17, a disk type hologram scanner or a cylindrical hologram scanner may be used.

The present invention is not limited to the specifically disclosed embodiments, and variations and modifications may be made without departing from the scope of the present invention.

What is claimed is:

1. An image scanning apparatus scanning an image formed on an original sheet placed on a scan table, original sheet information including size and displacement information of said original sheet placed on said scan table being obtained before scanning of said image is performed, said image scanning apparatus comprising:

beam emitting means for emitting a coherent first beam;

deflecting means for deflecting said first beam so that said first beam traces a predetermined scan line on a plane including a surface of said original sheet, said predetermined scan line being formed on said plane so that a length of a beam path from a beam originating point of said deflecting means to any point on said predetermined scan line is uniform, and an incident angle of said first beam at any point on said surface of said original sheet is uniform;

beam sensing means for sensing an intensity of a second beam generated by reflection of said first beam at said surface of said original sheet, said second beam being input to said sensing means via said deflecting means;

said original sheet information being obtained in accordance with a detection of a sharp change in said intensity of said second beam received by said sensing means with reference to a scanning position of said first beam;

wherein said deflecting means is positioned between said beam emitting means and said scan table; and wherein said deflecting means comprises a rotating hologram.

2. The image scanning apparatus as claimed in claim 1, wherein said hologram is a transmission type hologram through which said first beam and said second beam passes.

3. An image scanning apparatus scanning an image formed on an original sheet placed on a scan table, original sheet information including size and displacement information of said original sheet placed on said scan table being obtained before scanning of said image is performed, said image scanning apparatus comprising:

beam emitting means for emitting a coherent first beam;

deflecting means for deflecting said first beam so that said first beam traces a predetermined scan line on a plane including a surface of said original sheet, said predetermined scan line being formed on said plane so that a length of a beam path from a beam originating point of said deflecting means to any point on said predetermined scan line is uniform, and an incident angle of said first beam at any point on said surface of said original sheet is uniform;

beam sensing means for sensing an intensity of a second beam generated by reflection of said first beam at said surface of said original sheet, said second beam being input to said sensing means via said deflecting means;

said original sheet information being obtained in accordance with a detection of a sharp change in said intensity of said second beam received by said sensing means with reference to a scanning position of said first beam; and wherein said predetermined scan line forms at least part of a circle having a center which corresponds to a beam originating point of said deflecting means when said circle is viewed in a direction perpendicular to said plane.

4. The image scanning apparatus as claimed in claim 3, wherein said predetermined scan line forms a complete circle.

5. The image scanning apparatus as claimed in claim 4, wherein said deflecting means splits said first beam so that a plurality of scan lines are formed on said surface of said original sheet, said scan lines being concentric circles having different diameters.

6. An image scanning apparatus scanning an image formed on an original sheet placed on a scan table, original sheet information including size and displacement information of said original sheet placed on said scan table being obtained before scanning of said image is performed, said image scanning apparatus comprising:

beam emitting means for emitting a coherent first beam;

deflecting means for deflecting said first beam in a direction parallel to a plane including a surface of said original sheet placed on said scan table;

direction changing means for changing said first beam deflected by said parallel deflecting means to a direction perpendicular to said plane so that said first beam is projected onto said original sheet in the direction perpendicular to said surface of said original sheet; and beam sensing means for sensing an intensity of a second beam generated by reflection of said first beam at said surface of said original sheet, said second beam being input to said sensing means via said deflecting means;

said original sheet information being obtained in accordance with a detection of a sharp change in said intensity of said second beam received by said sensing means with reference to a scanning position of said first beam.

7. The image scanning apparatus as claimed in claim 6, wherein said parallel deflecting means comprises a rotating polygon mirror.

8. The image scanning apparatus as claimed in claim 6, wherein said direction changing means comprises an optical mirror system including a plurality of mirrors.

* * * * *